D. BOYLE.
Ice and Refrigerating Machine.

No. 242,107.  Patented May 31, 1881.

Witnesses:
H. F. Bruns.
O. W. Bond.

Inventor:
David Boyle

2 Sheets—Sheet 2.
D. BOYLE.
Ice and Refrigerating Machine.
No. 242,107.                  Patented May 31, 1881.
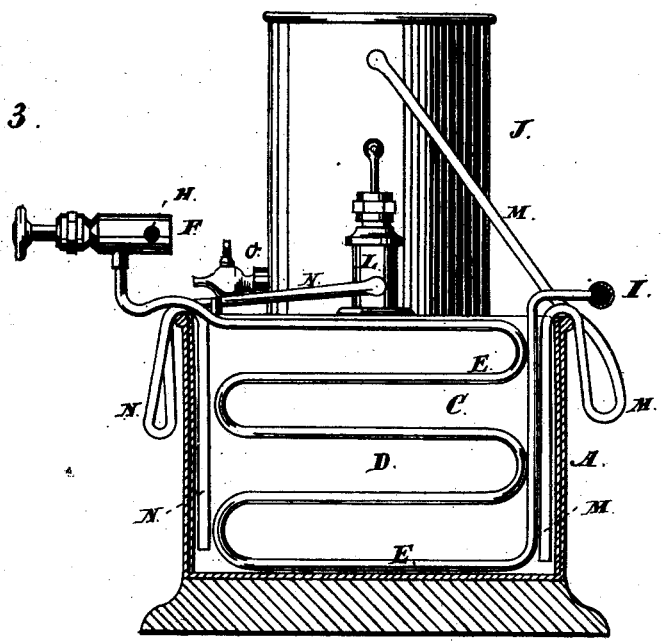
Fig. 3.
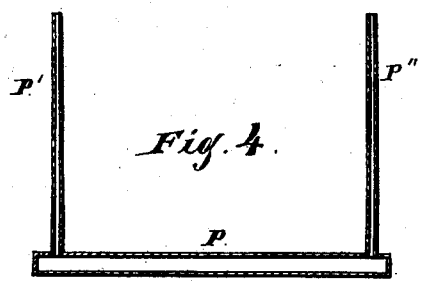
Fig. 4.
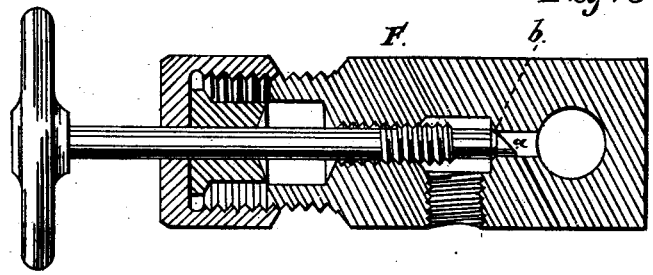
Fig. 5.
Fig. 6.
Witnesses:                                Inventor:
J. T. Binns.                              David Boyle
O. W. Bond.
N. PETERS, Photo-Lithographer, Washington, D. C.

UNITED STATES PATENT OFFICE.

DAVID BOYLE, OF CHICAGO, ILLINOIS.

ICE AND REFRIGERATING MACHINE.

SPECIFICATION forming part of Letters Patent No. 242,107, dated May 31, 1881.

Application filed December 27, 1878.

*To all whom it may concern:*

Be it known that I, DAVID BOYLE, of the city of Chicago, Cook county, State of Illinois, have invented new and useful Improvements in Ice and Refrigerating Machines, of which the following is a full description, reference being had to the accompanying drawings, in which—

Figure 1:
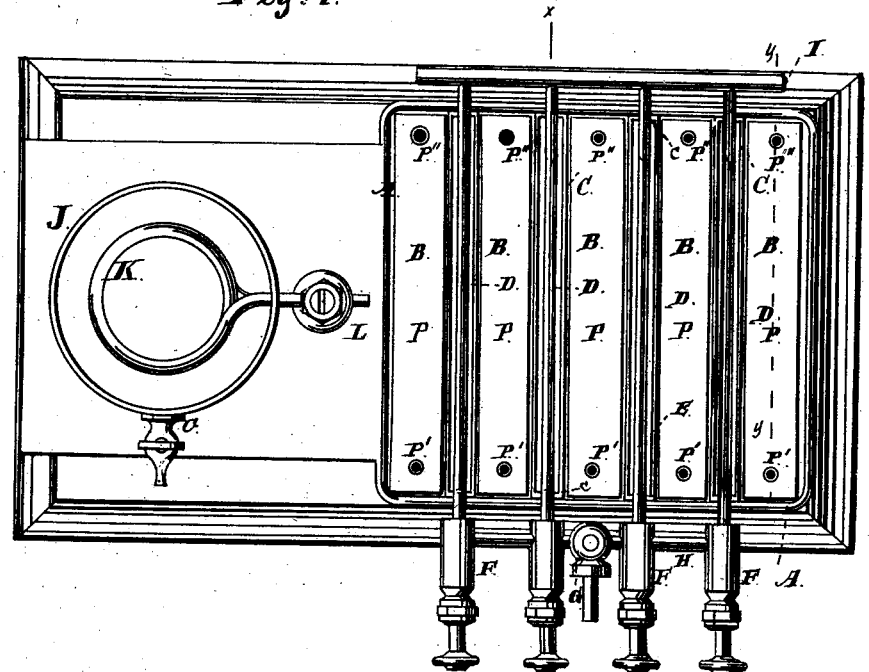
Figure 2:
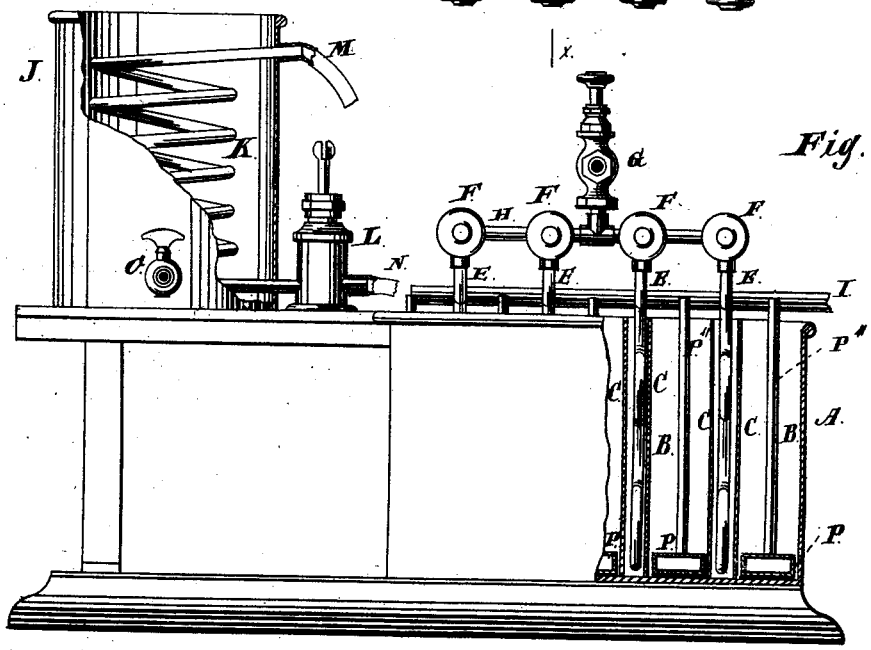

Figure 1 is a top or plan view; Fig. 2, a side elevation, partly broken away; Fig. 3, a section on line $xx$ of Fig. 1; Fig. 4, a section, on line $yy$ of Fig. 1, of the thawing-tube; Fig. 5, an enlarged detail in section of the distributing-valve; Fig. 6, a section at end of valve.

This invention relates to ice and refrigerating machines; and has for its object a positive, independent, and variable supply of a volatile liquid to each of the evaporating vessels or coils, for the purpose of compelling a uniform distribution over the whole freezing or cooling surface, and to enable such distribution to be regulated as required for each particular section of the evaporators; in insuring a better discharge of the liquid from the distributing-valve for each of the evaporating-coils, by presenting a fine point or opening as the discharge commences, which will be gradually enlarged as the valve is raised from its seat; in circulating the non-congealable liquid from any point in the freezing-tank through the water-supply tank back to the freezing-tank, for the purpose of thawing or loosening the ice from the sides of the freezing plates or tank, and cooling the water in the supply-tank preparatory to being introduced in the freezing-tank; and in preventing the freezing of the ice to the bottoms of the tanks proper, so as to lessen the labor of removal. And its nature consists in providing the point of distributing-valve with a projecting V-shaped notch or cut; in providing the supply-tank with a coil connected with a force-pump, and attaching to such pump and coil pieces of hose or pipe, adapted to enter any section of the freezing-tank, to take the uncongealable liquid or brine from the tank and return it through the coil; in providing tubes located at the bottom of the freezing-tanks and extending from freezing-plate to freezing-plate, through which steam, air, or water can be passed; and in the several parts and combination of parts hereinafter set forth as new.

In the drawings, A represents a freezing-tank; B, the ice-compartments; C, the freezing-plates; D, the evaporator-compartments; E, the evaporator-coils; F, the distributing-valves; G, the liquid-supply valve; H, the distributing-main; I, the discharging-main; J, the supply-tank; K, the coil in the supply-tank; L, the pump; M, the hose or pipe attached to the coil K; N, the hose or pipe attached to the pump; O, the discharge for the fresh supply of water; P, the secondary bottoms or thawing-tubes; P′ P″, the inlet and outlet pipes for the tube P; $a$, the projecting V-shaped cut on the end of the distributing-valve; $b$, the valve-seat.

The tank A may be of any suitable construction and of any desired size for receiving the water for the ice and the devices by which the freezing is accomplished, which devices may be of any of the ordinary and well-known forms of construction and arrangement in machines of this description.

The construction and arrangement of the ice-chambers and the evaporating-chambers and their fluid-coils may be the same as that shown and described in the patent granted to me May 11, 1875, No. 163,144, or they may be constructed and arranged in any other suitable manner.

As shown, the tank A is divided or separated into ice-chambers B by the introduction of the evaporating-chambers D, suitable openings or spaces $c$ being left at the ends of such chambers to form a means of communication between the several ice-chambers, to provide for the circulation of the water.

The freezing-plates C are made of any suitable material and form the sides of the evaporating-chambers D, being secured to the ends of the chambers in any suitable manner, so as to form a water-tight compartment or chamber in each instance, in which is placed the uncongealable liquid. In each of these compartments is located a coil, E, for passing a volatile fluid through the chamber. These evaporating-coils, in the form shown, receive the volatile liquid from the main H, to which it is supplied through a valve, G, of suitable construction, from a condenser in the usual manner, and after thus passing it through the uncongealable liquid discharge the gas formed therefrom into the main or pipe I, from which it is carried to a gas-compressing pump in the usual manner.

The distributing-main H and gas-main I may be of any suitable construction for accomplishing their respective functions.

On the main H, at the proper points to control the admission of the volatile fluid to the coils E or evaporating-chambers, are located valves F, which may be of any construction suitable for the purpose of regulating the supply of the fluid to each section of the evaporator independent of the other sections.

The end of the valve, in the form shown, is provided with an inclined or V-shaped cut or notch, $a$, which presents a fine point or opening for the egress of the liquid as the valve is first raised, which will be gradually enlarged as the valve is raised from its seat $b$, so that a greater egress of the fluid will be produced, by which means the introduction of the liquid to each particular section can be made greater or less, as desired, by raising or lowering the valve for that particular section of the evaporator.

The tank J may be made of any suitable material, and is to be of a sufficient capacity to contain water enough to fill the freezing-tank with the quantity of water required for freezing. In this tank is located a pipe-coil, K, one end of which passes through the side of the tank, and is suitably connected with a force-pump, L, of ordinary construction, and the other end also passes through the side of the tank, and to it is attached a hose or pipe, M, a similar hose or pipe being also attached to the pump L. Each hose or pipe M N can be made to enter any desired part of the freezing-tank to remove the uncongealable liquid therefrom, and return the liquid to the same point in the freezing-tank.

A suitable discharge valve or cock, O, is attached to the tank J, by means of which and a suitable pipe or hose attached thereto the water can be drawn from the tank J into the freezing-tank.

At the bottom of each ice-chamber B is located a flat hollow tube or plate, P, which extends from freezing-plate to freezing-plate, which tube is provided with an inlet-pipe, P', and an outlet-pipe, P'', extending up, as shown, to the top of the freezing-tank. These tubes or plates P form a secondary bottom, on which the ice is frozen instead of being frozen directly to the bottom of the tank, so that by passing a thawing medium through the tubes and plates the ice can be readily and easily detached.

In operation, the freezing-tank is filled with water to the proper level in the compartments or chambers B, and the compartments or chambers D are filled with an uncongealable liquid, and the volatile fluid is admitted to the coils, chilling the plates C, and forming ice thereon in the usual manner. The volatile or other cooling liquid is admitted to each section of the evaporator through the valves F, and by providing a separate and independently operated valve for each section, a positive admission is provided, which can be made variable, so as to insure a uniform distribution over the whole cooling or freezing surface, and the admission of the fluid to any particular section of the evaporator can be regulated so as to give an accelerated or reduced rate of cooling, as required for such evaporator-section; and by making the distributing-valve so as to present a varying point or opening for the admission of the volatile fluid the distribution can be very evenly performed, so as to render the freezing more uniform and regular.

By constructing the distributing-valve as described, it will, in operation, clear itself of minute obstruction to its opening when opened wider.

After ice of the required thickness is formed on the freezing-plates C, the hose or pipes M N are to be placed in the same compartment or chamber D of the freezing-tank and the pump L operated, which draws the uncongealable liquid therefrom, passes it through the coil K in the tank J, and returns it to the freezing-tank. This circulation of the uncongealable liquid will cool the water in the supply-tank J by supplying heat to the uncongealable liquid, which heat will be imparted to the freezing-plates, and will be sufficient to thaw the ice from the freezing-surfaces, and at the same time water, steam, air, or other heating medium is passed through the inlet-pipe P', through the hollow tube or plate P, out through the pipe P'', warming the plates sufficiently to thaw the ice therefrom, so that the ice can be easily removed from the chamber. This thawing process is applied to each section or compartment of the freezing-tank until the ice formed therein has been removed, when it is stopped until the ice is again formed on the freezing-plates.

After the ice has been removed the freezing-tank is to be filled with water from the tank J, which water has been cooled by the warming of the uncongealable liquid, and the volatile fluid, which has been shut off from the evaporating-chambers during the process of removing the ice, is again admitted to the sections of the evaporator, forming the ice, as before described.

In place of the coil K a pipe, tube, or other conduit, by which the uncongealable liquid can be passed through the water in the supply-tank, may be used.

The distributing-valves are applicable to other forms of evaporators than that shown, for the purpose of producing a positive, independent, and variable supply of the volatile or cooling fluid to any particular section of the evaporator.

What I claim as new, and desire to secure by Letters Patent, is—

1. The combination of a water-supply tank provided with a conduit through it with the freezing-tank and connecting pipe or hose for circulating the uncongealable liquid through both, for cooling the water in the supply-tank and raising the temperature of the uncongealable liquid in the freezing-tank, to loosen the ice from the freezing-tank and its division-plates, substantially as specified.

2. A distributing-valve having at its point or end an inclined projection extending beyond the seat $b$, for producing a fine jet or stream as the valve is first raised, and enlarging the same as the valve is raised from its seat, substantially as and for the purposes specified.

3. The water-supply tank J and coil K, in combination with the pump L, pipes or hose N and M, and tank A, whereby the non-congealing liquid is circulated to decrease the temperature of the water in tank J and raise the temperature of the freezing-compartment, and thereby loosen or detach the previously-formed ice, substantially as specified.

4. The hollow plate or tube P, forming the bottom of the freezing-compartment, in combination with one or more induction-pipes for introducing a warm fluid for detaching the ice, substantially as described.

DAVID BOYLE.

Witnesses:
   O. W. BOND,
   H. F. BRUNS.